US007040757B2

(12) United States Patent
Hall et al.

(10) Patent No.: US 7,040,757 B2
(45) Date of Patent: *May 9, 2006

(54) CONTACT LENSES

(75) Inventors: Jordan William Hall, Atlanta, GA (US); Joseph Michael Lindacher, Lawrenceville, GA (US); Ming Ye, Fort Worth, TX (US)

(73) Assignee: Novartis AG, Basel (CH)

( * ) Notice: Subject to any disclaimer, the term of this patent is extended or adjusted under 35 U.S.C. 154(b) by 0 days.

This patent is subject to a terminal disclaimer.

(21) Appl. No.: 10/635,817

(22) Filed: Aug. 6, 2003

(65) Prior Publication Data

US 2005/0068489 A1    Mar. 31, 2005

Related U.S. Application Data

(60) Provisional application No. 60/401,736, filed on Aug. 6, 2002.

(51) Int. Cl.
G02C 7/04 (2006.01)
(52) U.S. Cl. .................... 351/160 R; 351/177
(58) Field of Classification Search ............ 351/160 R, 351/160 H, 161, 162, 177
See application file for complete search history.

(56) References Cited

U.S. PATENT DOCUMENTS

| 2,544,246 A | * | 3/1951 | Butterfield ............... 351/160 R |
| 4,254,065 A | | 3/1981 | Ratkowski .................. 264/2.5 |
| 4,310,225 A | | 1/1982 | Davis ......................... 351/176 |
| 4,418,991 A | | 12/1983 | Breger ....................... 351/161 |
| 4,525,043 A | * | 6/1985 | Bronstein ............... 351/160 R |
| 4,573,775 A | | 3/1986 | Bayshore .................... 351/161 |
| 4,580,882 A | | 4/1986 | Nuchman et al. ........... 351/161 |
| 4,614,413 A | | 9/1986 | Obssuth ...................... 351/161 |
| 4,618,227 A | | 10/1986 | Bayshore .................... 351/161 |
| 4,618,229 A | | 10/1986 | Jacobstein et al. .......... 351/161 |
| 4,702,573 A | | 10/1987 | Morstad ..................... 351/161 |
| 4,859,049 A | | 8/1989 | Muller ....................... 351/161 |
| 4,874,234 A | | 10/1989 | Wichterle ................... 351/161 |
| 5,071,244 A | | 12/1991 | Ross .......................... 351/161 |
| 5,341,604 A | | 8/1994 | Wood .......................... 51/165 |
| 5,404,183 A | | 4/1995 | Seidner ...................... 351/161 |
| 5,493,350 A | | 2/1996 | Seidner ...................... 351/161 |
| 5,499,064 A | | 3/1996 | Vansaghi .................... 351/158 |

(Continued)

FOREIGN PATENT DOCUMENTS

CA    1333757    1/1995

(Continued)

OTHER PUBLICATIONS

International Search Report PCT/EP03/08658.

(Continued)

Primary Examiner—Jordan M. Schwartz
(74) Attorney, Agent, or Firm—Jian Zhou

(57) ABSTRACT

The invention provides a contact lens which requires a predetermined orientation on an eye. The contact lens comprises an anterior surface and an opposite posterior surface. The anterior surface includes a vertical meridian, a horizontal meridian, a central optical zone, a transitional non-optical zone surrounding the central optical zone, a peripheral zone surrounding the transitional non-optical zone, and an edge zone circumscribing and tangent to the peripheral zone. The presence of the transitional non-optical zone provides a continuous transition from the central optical zone to the peripheral zone and enables separate and independent designs of the central optical zone and the peripheral zone. Orientation features are incorporated only in the peripheral zone, does not provide an prism optical distortion, and can maintain a predetermined orientation of the lens on an eye.

48 Claims, 2 Drawing Sheets

U.S. PATENT DOCUMENTS

| | | |
|---|---|---|
| 5,526,071 A | 6/1996 | Seidner et al. ............... 351/161 |
| 5,532,768 A | 7/1996 | Onogi et al. ............ 351/160 R |
| 5,619,289 A | 4/1997 | Seidner et al. .............. 351/161 |
| 5,635,998 A | 6/1997 | Baugh ........................ 351/161 |
| 5,691,797 A | 11/1997 | Seidner et al. .............. 351/161 |
| 5,861,114 A | 1/1999 | Roffman et al. ............. 264/2.5 |
| 5,971,542 A | 10/1999 | Volker et al. ................ 351/161 |
| 6,089,711 A | 7/2000 | Blankenbecler et al. 351/160 R |
| 6,109,749 A | 8/2000 | Bernstein ................... 351/161 |
| 6,158,861 A | 12/2000 | Oyama et al. .......... 351/160 R |
| 6,176,578 B1 | 1/2001 | Clutterbuck et al. ........ 351/160 |
| 6,183,082 B1 | 2/2001 | Clutterbuck ............... 351/160 |
| 6,206,520 B1 | 3/2001 | Jubin et al. ................. 351/160 |
| 6,270,218 B1 | 8/2001 | Clutterbuck ............... 351/160 |
| 6,364,483 B1 | 4/2002 | Grossinger et al. ......... 351/161 |
| 6,406,145 B1 | 6/2002 | Jubin ......................... 351/177 |
| 6,454,409 B1 | 9/2002 | Lorenz et al. .............. 351/160 |
| 6,457,826 B1 | 10/2002 | Lett ........................... 351/161 |
| 6,467,903 B1 * | 10/2002 | Back ..................... 351/160 H |
| 6,474,814 B1 | 11/2002 | Griffin ....................... 351/161 |
| 6,491,392 B1 | 12/2002 | Roffman et al. ............ 351/160 |
| 6,568,990 B1 | 5/2003 | Siders et al. ................... 451/5 |
| 6,595,639 B1 | 7/2003 | Ho et al. .................... 351/177 |
| 2002/0021410 A1 | 2/2002 | Ye et al. ..................... 351/161 |
| 2002/0024631 A1 | 2/2002 | Roffman et al. ............ 351/161 |
| 2002/0159025 A1 | 10/2002 | Legerton et al. ........ 351/160 R |
| 2002/0186345 A1 | 12/2002 | Duppstadt ................... 351/161 |
| 2003/0016331 A1 | 1/2003 | Mandell ..................... 351/161 |
| 2003/0081171 A1 | 5/2003 | Griffin ....................... 351/161 |
| 2004/0156013 A1 * | 8/2004 | Lindacher et al. ...... 351/160 R |
| 2004/0207807 A1 * | 10/2004 | Lindacher .............. 351/160 R |
| 2004/0257526 A1 * | 12/2004 | Lindacher ................... 351/168 |

FOREIGN PATENT DOCUMENTS

| | | |
|---|---|---|
| EP | 0 566 170 | 10/1993 |
| EP | 0745 876 A2 | 12/1996 |
| FR | 2 582 416 | 5/1985 |
| GB | 1 463 107 | 2/1977 |
| WO | WO 84/04401 | 11/1984 |
| WO | WO 94/23327 | 10/1994 |
| WO | WO 96/08745 | 3/1996 |
| WO | WO 99/23527 | 5/1999 |
| WO | WO 98/45749 | 10/1999 |
| WO | WO 00/48036 | 8/2000 |
| WO | WO 01/44860 | 6/2001 |
| WO | WO 01/75509 A1 | 10/2001 |

OTHER PUBLICATIONS

Annex to the Standard Search Report; Dated Jan. 20, 2003, RS 108891.

* cited by examiner

CONTACT LENSES

This application claims under 35 U.S.C. § 119 (e) the benefit of the filing date of U.S. Provisional Patent Application Ser. No. 60/401,736 filed Aug. 6, 2002, incorporated by reference in it's entirety.

This invention is related to contact lenses. In particular, the present invention is related to contact lenses, which require a predetermined orientation on an eye, such as toric contact lenses, biofocal or multifocal contact lenses, or toric multifocal contact lenses. Contact lenses of the invention may provide an improved visual performance since prism optical effects derived from incorporation of orientation features in the lenses are substantially eliminated.

BACKGROUND

Contact lenses are widely used for correcting many different types of vision deficiencies. These include defects such as near-sightedness and far-sightedness (myopia and hypermetropia, respectively), astigmatism, and defects in near range vision usually associated with aging (presbyopia).

It is believed that presbyopia occurs as a person ages when the lens of the eye begins to crystallize and lose its elasticity, eventually resulting in the eye losing the ability to focus at near distances, such as the normal reading distance, and in some cases at intermediate distances. Presbyopic persons (presbyopes) complain of difficulty performing close tasks. To compensate for presbyopia, ophthalmic lenses are required that are more positively powered or less negatively powered than the distance correction. Some presbyopic persons have both near vision and far vision defects, requiring segmented bifocal or multifocal lenses or progressive multifocal lenses, instead of single vision lenses, to properly correct their vision.

Astigmatism occurs as the refractive error in an eye is dependent upon meridian. This is usually due to one or more refractive surfaces, most commonly the anterior cornea, having a toroidal shape. It may also be due to one or more surfaces being transversely displaced or tilted. Astigmatism is usually regular, which means that the principal (maximum and minimum power) meridians are perpendicular to each other. People with astigmatism have blurred vision at all distances, although this may be worse at distance or near, depending on the type of astigmatism. These people may complain of sore eyes and headaches associated with demanding visual tasks. Astigmatism can corrected with an astigmatic ophthalmic lens, which usually has one spherical surface and one toroidal (cylindrical) surface.

Large population of presbyopes also has an astigmatism vision error. Those presbyopes may require to wear contact lenses capable of correcting both astigmatism and presbyopia. Such contact lenses are disclosed in a co-pending U.S. patent application Ser. No., entitled Toric Multifocal Contact lenses, and have a cylindrical optical surface (or power) to correct astigmatism vision errors and a multifocal power to compensate for presbyopia.

Effective use of a contact lens, such as a toric contact lens, a segmented multifocal contact lens or a toric multifocal contact lens, requires a predetermined orientation on an eye. One of the most commonly utilized basic techniques, which can maintain a predetermined orientation of a contact lens on an eye, is prism stabilization. By using this technique, a contact lens is provided with prism ballast, which is generally a base-down prism to increase the mass of the lower portion of the lens and to create a weighting effect to orient the lens. However, there are some disadvantages associated with designs of contact lenses having prism ballast in the prior art. Those lenses are not comfortable to wear and/or not highly effective in maintaining lens orientation. Furthermore, current contact lenses with prism ballast as orientation feature may not be able to provide better visual performance since they tend to have optical distortions known as prism.

Therefore, there is a need for a contact lens with an orientation feature, wherein the lens is substantially free of prism optical effects and is comfortable to wear.

An object of the invention is to provide a contact lens having an orientation feature which can maintain a predetermined orientation on an eye while it does not cause prism optical distortions.

Another object of the invention is to provide a family of toric and/or multifocal contact lenses each having an orientation feature which can maintain a predetermined orientation on an eye while it does not cause prism optical distortions.

A further object of the invention is to provide a method for producing a contact lens having an orientation feature which can maintain a predetermined orientation on an eye while it does not cause prism optical distortions.

SUMMARY OF THE INVENTION

In accomplishing the foregoing, there is provided, in accordance with one aspect of the present invention, a contact lens having an orientation feature that does not provide an prism optical distortion and can maintain a predetermined orientation of the lens on an eye. A contact lens of the invention comprises an anterior surface and an opposite posterior surface. The anterior surface includes a vertical meridian, a central optical zone, a blending zone extending outwardly from the central optical zone, a peripheral zone surrounding the blending zone, and an edge zone circumscribing and tangent to the peripheral zone. The presence of the blending zone ensures that the peripheral zone, the blending zone and the central optical zone are tangent to each other. The peripheral zone has a surface that, in combination with the posterior surface, provides in the peripheral zone a lens thickness profile characterized by having a lens thickness which increases progressively from the top of the lens downwardly along each of the vertical meridian and lines parallel to the vertical meridian until reaching a maximum value at a position between the optical zone and the edge zone and then decreases to the edge of the edge zone. Preferably, the lens thickness profile has a mirror symmetry with respect to a plane cutting through the vertical meridian. More preferably, the peripheral zone below the optical zone comprises a ridge feature disposed below the optical zone, wherein the ridge feature extends outwardly from the anterior surface. Even more preferably, the peripheral zone comprises a ramped ridge zone disposed below the optical zone, wherein the ramped ridge zone includes an upper edge, a lower ramped edge, a latitudinal ridge that extends outwardly from the anterior surface, and a ramp that ensures a smooth transition between the lower ramped edge and surrounding surface of the peripheral zone. A ridge feature or a ramped ridge feature can further increase the mass of the lower portion of the lens and create an increased weighting effect to orient the lens.

The present invention, in another aspect, provides a contact lens having a double slab-off-like features on the anterior surface thereof. Such contact lens comprises an anterior surface and an opposite posterior surface. The anterior surface includes a horizontal meridian, a vertical meridian, a central optical zone, a blending zone extending outwardly from the central optical zone, a peripheral zone surrounding the blending zone, and an edge zone circumscribing and tangent to the peripheral zone. The presence of the blending zone ensures that the peripheral zone, the blending zone and the central optical zone are tangent to each other. The peripheral zone has a surface that, in combination with the posterior surface, provides in the peripheral zone a lens thickness profile characterized by having a mirror symmetry with respect to a plane cutting through the vertical meridian. The lens thickness profile in the peripheral zone is further characterized by having a substantially constant thickness in a region around the horizonal meridian and having a thickness which decreases progressively from the center to the top or bottom of the contact lens along each of the vertical meridian and lines parallel to the vertical meridian. Preferably, the surface of the peripheral zone includes a series of isolines from one side to the other side of the lens. The thickness of the lens in the peripheral zone is substantially constant along each of the series of isolines. More preferably, each of isolines above the horizontal meridian is a different arc mimicking an edge arc of the upper eyelid of an eye at a given eye-opening position, whereas each of isolines below the horizontal meridian is a different arc mimicking an edge arc of the lower eyelid of the eye at a given eye-opening position. Even more preferably, the thickness of the lens in the peripheral zone decreases significantly when approaching the top or bottom of the lens.

The invention, in another aspect, provides a method for producing a contact lens having an orientation feature of the invention as described above. The method comprises the steps of shaping a contact lens by a manufacturing means to have an anterior surface having a vertical meridian, a horizontal meridian, a central optical zone, a blending zone extending outwardly from the central optical zone, a peripheral zone surrounding the blending zone, and an edge zone circumscribing and tangent to the peripheral zone; and an opposite posterior surface, wherein the blending zone has a surface which ensures that the peripheral zone, the blending zone and the central optical zone are tangent to each other, and wherein the peripheral zone has a surface that, in combination with the posterior surface, provides in the peripheral zone of the lens a thickness profile which is characterized (1) by having a lens thickness which increases progressively from the top of the lens downwardly along each of the vertical meridian and lines parallel to the vertical meridian until reaching a maximum value at a position between the optical zone and the edge zone and then decreases to the edge of the edge zone; or (2) by having a mirror symmetry with respect to a plane cutting through the vertical meridian, by having a substantially constant thickness in a region around the horizonal meridian and by having a thickness which decreases progressively from the horizontal meridian to the top or bottom of the contact lens along each of the vertical meridian and lines parallel to the vertical meridian.

The invention, in a further aspect, provides a family of contact lenses having a series of different cylindrical power corrections and/or different multifocal powers, wherein each contact lens in the series comprises: an anterior surface having a vertical meridian, a horizontal meridian, a central optical zone, a blending zone extending outwardly from the central optical zone, a peripheral zone surrounding the blending zone, and an edge zone circumscribing and tangent to the peripheral zone; and an opposite posterior surface, wherein the peripheral zone, the blending zone and the central optical zone are tangent to each other, and wherein the peripheral zone has a surface that, in combination with the posterior surface, provides in the peripheral zone of the lens a thickness profile which is characterized (1) by having a lens thickness which increases progressively from the top of the lens downwardly along each of the vertical meridian and lines parallel to the vertical meridian until reaching a maximum value at a position between the optical zone and the edge zone and then decreases to the edge of the edge zone; or (2) by having a mirror symmetry with respect to a plane cutting through the vertical meridian, by having a substantially constant thickness in a region around the horizonal meridian and by having a thickness which decreases progressively from the horizontal meridian to the top or bottom of the contact lens along each of the vertical meridian and lines parallel to the vertical meridian.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE PREFERRED EMBODIMENTS

Figure 1:
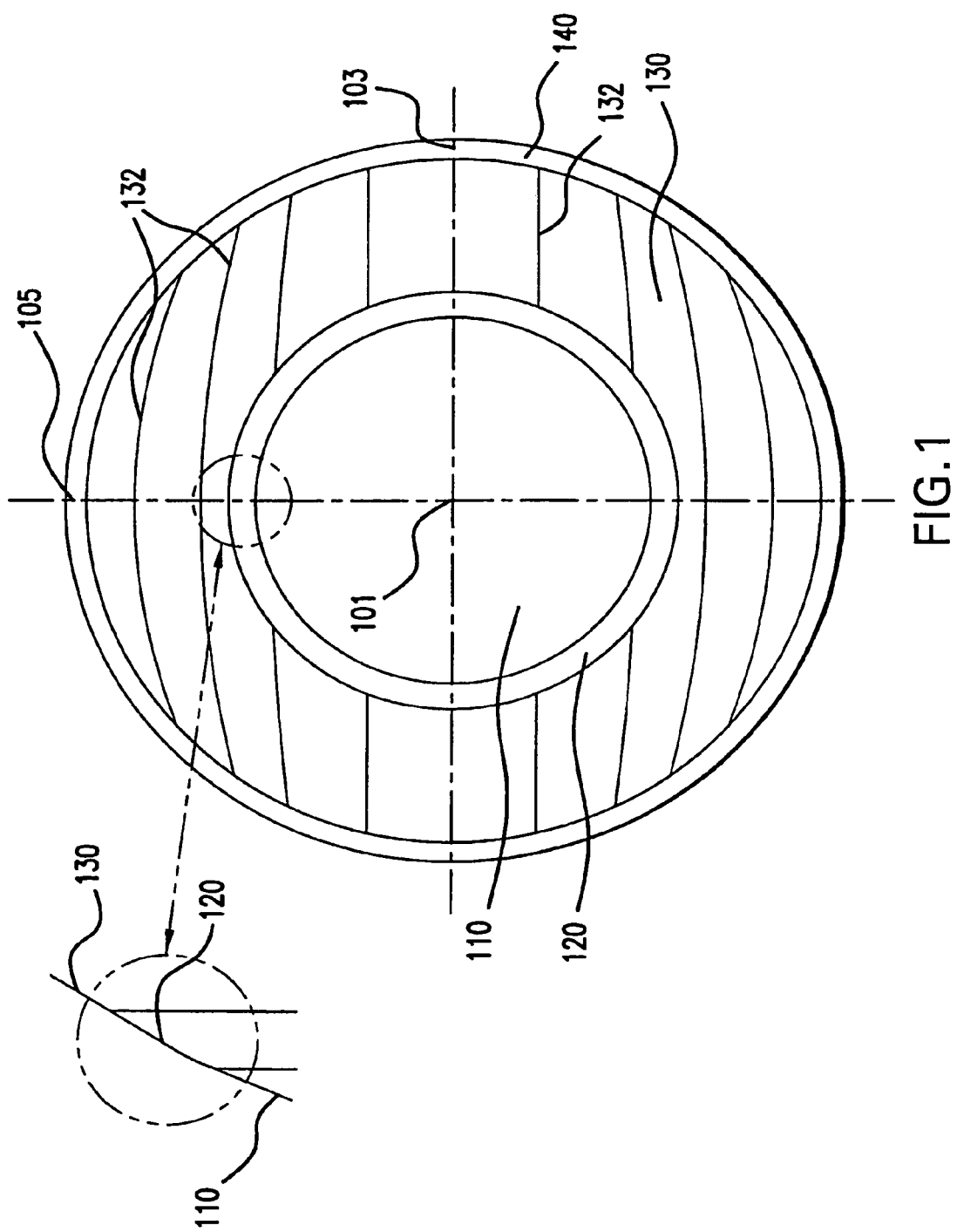
FIG. 1 is a front elevational view of a preferred embodiment of the invention.

Reference now will be made in detail to the embodiments of the invention. It will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

In one embodiment, the present invention provide a contact lens comprising: an anterior surface having a vertical meridian, a horizontal meridian, a central optical zone, a blending zone extending outwardly from the central optical zone, a peripheral zone surrounding the blending zone, and an edge zone circumscribing and tangent to the peripheral zone; and an opposite posterior surface, wherein the blending zone has a surface which ensure that the peripheral zone, the blending zone and the central optical zone are tangent to each other, and wherein the peripheral zone has a surface that, in combination with the posterior surface, provides in the peripheral zone a lens thickness profile characterized by having a thickness which increases progressively from the top of the lens downwardly along each of the vertical meridian and lines parallel to the vertical meridian until reaching a maximum value at a position between the optical zone and the edge zone and then decreases to the edge of the edge zone.

A "vertical meridian" refers to an imaginary line running vertically from the top, through the center, to the bottom of the anterior surface of a contact lens when said contact lens is maintained at a predetermined orientation on an eye. A "horizontal meridian" refers to an imaginary line running horizontally from the left side, through the center, to the right side of the anterior surface of a contact lens when said contact lens is maintained at a predetermined orientation on an eye. The horizontal and vertical meridians are perpendicular to each other.

The peripheral zone can be composed of one or more peripheral bands or regions which are patched together to form a continuous surface. The area of the peripheral zone typically is equal to or larger than the area of the central optical zone, preferably is at least about 60% of the total area of the anterior surface of a contact lens.

It is discovered that, when a contact lens has in the peripheral zone a lens thickness profile characterized by having a thickness which increases progressively from the top of the lens downwardly along each of the vertical meridian and lines parallel to the vertical meridian until reaching a maximum value at a position between the optical zone and the edge zone and then decreases to the edge of the edge zone, such contact lens can be maintained at a predetermined orientation on an eye. Like a conventional lens ballast, the orientation feature of the invention works by weighing the lens at the bottom, causing it to come to an equilibrium position on the eye. With such orientation feature, the optical zone of the anterior surface can be designed independently that can provide an optimal visual performance.

In a preferred embodiment, the lens thickness profile has a mirror symmetry with respect to a plane cutting through the vertical meridian.

In another preferred embodiment, the anterior surface can have a series of isolines from one side to the other side of the lens. Along each of the series of isolines, the lens thickness in the peripheral zone remains substantially constant. It is understood that there could be some variation in thickness in a small portion near the outer peripheral edge of the peripheral zone. The isolines can all be straight lines parallel to the horizontal meridian; or one of the isolines is a straight line coincidental with the horizontal meridian and the rest isolines are arcs. Preferably, each of arcs above the horizontal meridian is different from each other and mimics one arc of the edge of the upper eyelid of an eye at an eye-opening position, whereas each of arcs below the horizontal meridian is different from each other and mimics one arc of the edge of the lower eyelid of the eye at the eye-opening position.

Another preferred embodiment of the peripheral zone is a ridge feature disposed below the central optical zone, wherein the ridge feature extends outwardly from the anterior surface to enable engagement with a lower eyelid of a user and thereby provide vertical translation support for the contact lens when being worn by the user. Preferably, the peripheral zone comprises a ramped ridge zone as disclosed in a copending U.S. patent applicant Ser. No. 10/616,476, entitled "Translating Contact Lens Having A Ramped Ridge", herein incorporated by reference in its entirety. The ramped ridge zone is disposed below the central optical zone, and includes an upper edge, a lower ramped edge, a latitudinal ridge that extends outwardly from the anterior surface, and a ramp that ensures a smooth transition between the lower ramped edge and surrounding surface of the peripheral zone. The lower eyelid of the eye is engaged with at least some portion of the ramped ridge zone at all times to provide vertical translation support for the contact lens when being worn by the user.

One advantage of incorporating a ramp in the ramped ridge zone is that it can provide a smooth transition zone for the eyelid to "ramp up" the ridge. This gradual engagement will benefit the wearer by increasing comfort and reducing lens sensation in the eye because the ridge will always be engaged.

Another advantage of incorporating a ramp in the ramped ridge zone is that, since the ramp slope can determine lens position on an eye in primary gaze (horizontal), a lens design for a desired visual performance can be reliably implemented in the production of translating contact lenses. For example, a ramp is composed of a simple spherical curvature. The slope of a ramp depends on the radius of the curvature. Where a curvature has a large radius, the ramp is longer and steep. Where a curvature has a small radius, the ramp is shorter and flat. For a bifocal translating contact lens, the curvature of a ramp can have a radius of between 0.1 to 2.0 mm to provide a desired lens position on the eye in the primary gaze.

As will be readily appreciated by those of skill in the art, many different types of ramped ridge zones are possible with the present invention. Exemplary preferred ramped ridge zones include without limitation to: a ramped ridge zone having a flattened lower ramp edge and a flattened latitudinal ridge; and a ramped ridge zone having two bumps formed at the two end of the latitudinal ridge the elevation height of which are higher at the both ends than in the middle. The above ramped ridge zones may accommodate better to the lower eyelid of the eye, and may distribute more uniformly translating stress over the entire lens-interacting portion of the lower eyelid.

In a preferred embodiment, the entire peripheral zone of a contact lens of the invention has a continuity in first derivative and/or in second derivative. Such peripheral zone can be a continuous surface defined by one or more mathematical functions, preferably by a spline-based mathematical function, or is made of several different surface patches.

"Surface patches" refer to combinations of curvatures and lines that are continuous in first derivative, preferably in second derivative, from each other.

In another embodiment, the present invention provides a contact lens comprising: an anterior surface having a vertical meridian, a horizontal meridian, a central optical zone, a blending zone extending outwardly from the central optical zone, a peripheral zone surrounding the blending zone, and an edge zone circumscribing and tangent to the peripheral zone; and an opposite posterior surface, wherein the blending zone has a surface which ensure that the peripheral zone, the blending zone and the central optical zone are tangent to each other, and wherein the peripheral zone has a surface that, in combination with the posterior surface, provides in the peripheral zone a lens thickness profile characterized by having a mirror symmetry with respect to a plane cutting through the vertical meridian, by having a substantially constant thickness in a region around the horizonal meridian and by having a thickness which decreases progressively from the horizontal meridian to the top or bottom of the contact lens along each of the vertical meridian and lines parallel to the vertical meridian.

In a preferred embodiment, the anterior surface can have a series of isolines from one side to the other side of the lens. Along each of the series of isolines, the lens thickness in the peripheral zone remains substantially constant. It is understood that there could be some variation in thickness in a small portion near the outer peripheral edge of the peripheral zone. The isolines can all be straight lines parallel to the horizontal meridian; or one of the isolines is a straight line coincidental with the horizontal meridian and the rest isolines are arcs. Preferably, each of arcs above the horizontal meridian is different from each other and mimics one arc of the edge of the upper eyelid of an eye at an eye-opening position, whereas each of arcs below the horizontal meridian is different from each other and mimics one arc of the edge of the lower eyelid of the eye at the eye-opening position.

In a preferred embodiment, the entire peripheral zone of a contact lens of the invention has a continuity in first derivative and/or in second derivative. Such peripheral zone can be a continuous surface defined by one or more mathematical functions, preferably by a spline-based mathematical function, or is made of several different surface patches.

In another preferred embodiment, in the peripheral zone a lens thickness profile is characterized by having a mirror symmetry with respect to a plane cutting through the horizontal meridian.

The presence of a blending zone between the peripheral zone and the central optical zone is most preferably needed for enabling separate and independent designs of the central optical zone and the peripheral zone and for ensuring a continuous transition from the central optical zone to the peripheral zone. With a blending zone between the central optical zone and the peripheral zone, a contact lens can be produced to have flexion points and/or sharp edges at the junction between two zones being eliminated and thereby provide improved wearer's comfort. The blending zone of the invention can be any surface described by a mathematical function, preferably a spline-based mathematical function, or made of different surface patches.

A contact lens of the invention can be a toric, multifocal, or toric multifocal contact lens. As will be readily appreciated by those of skill in the art, many different types of optical zones are possible with the present invention.

For example, at least one of the optical zones of the anterior and posterior surfaces includes a first portion to provide distant vision correction for the eye and a second portion disposed beneath the first portion to provide near vision correction for the eye.

Another example is that at least one of the optical zones of the anterior and posterior surfaces has a distant vision zone, an intermediate vision zone, and a near vision zone. An optical zone including three vision zones can provide distance vision correction (e.g., driving), intermediate vision correction (e.g., working on computer), and near vision correction (e.g., reading books or newspapers). The intermediate vision zone is located between the distant vision zone and the near vision zone. The intermediate vision zone provides intermediate vision correction and has an area that is sufficient to overlay a substantial portion of the pupil and disposed in a position within the optical zone so that the pupil is substantially subtended by the intermediate vision zone when gazing at an intermediate vision point below the substantially horizontal point. Preferably, the intermediate vision zone is a progressive power zone having an optical power that continuously changes from distant vision to near vision.

A further example is that at least one of the optical zones of the anterior and posterior surfaces has a toric optics feature to correct for a wearer's astigmatism.

A still further example is that one of the optical zones of the anterior and posterior surfaces comprises a toric optics feature and the other optical zone comprises a multifocal optics feature, wherein both the optical zones combine together to provide a cylindrical optical power to correct astigmatism vision errors and a multifocal power to compensate for presbyopia.

The multifocal optics feature can be multiple concentric annular zones or a progressive power zone or the like. Preferably, the multifocal optics feature is a progressive power zone which is substantially concentric with the central axis. The progressive power zone has a diameter of preferably about 1.0 mm to about 3.0 mm, more preferably about 1.5 mm to 2.2 mm.

The toric optics feature can be on the anterior surface and the multifocal optics feature can be on the posterior surface or vice versa. Preferably, the toric optics feature is on the anterior surface and the multifocal optics feature is on the posterior surface.

The toric optics feature can have the shape of the toric optics of any conventional toric lens. Preferably, the toric optics feature is circular. More preferably, circular toric optics feature is substantially concentric with the central axis.

In another further example, one of the optical zones of the anterior and posterior surfaces comprises a toric optics feature and a multifocal optics feature therewithin, wherein the two optical zones combine together to provide a cylindrical optical power to correct astigmatism vision errors and a multifocal power to compensate for presbyopia. Both the toric and multifocal optics features can be either on the anterior surface or on the posterior surface. Preferably, both the toric and multifocal optics features are on the anterior surface.

The anterior surface of a contact lens preferably comprises a circular edge zone which is adjacent to the peripheral zone. The edge zone, in combination with the posterior surface, provides a substantially uniform thickness which may provide comfortable lens fit on an eye.

FIG. 1 is a front elevational view (the anterior surface) of a contact lens according to a preferred embodiment of the invention. The anterior surface of the contact lens 100 has a center 101, a horizontal meridian 103, a vertical meridian 105, a central optical zone 110, a blending zone 120, a peripheral zone 130, and a circular edge zone 140.

The blending zone 120 extends outwardly from the optical zone 110 to the peripheral zone 130. The blending zone 140 has a surface ensuring that the central optical zone 110, the blending zone 120 and the peripheral zone 130 are tangent to each other. The surface of the blending zone 120 is continuous in first and/or second derivative from the outer peripheral edge of the optical zone 110 to the inner peripheral edge of the peripheral zone 130. The surface of the blending zone 120 is described by a spline-based mathematical function.

The peripheral zone 130 includes a series of isolines along which the thickness of the contact lens are substantially constant. One of the isolines coincides with the horizontal meridian 103 running horizontally through the center 101 and the rest isolines are arc. Each of arcs, which are above the central horizontal isoline, is different from each other and mimics one arc of the peripheral edge of the upper eyelid of the human eye at a given eye-opening position. Each of arcs, which are below the central horizontal isoline, is different from each other and mimics one arc of the peripheral edge of the lower eyelid of the human eye at a given eye-opening position.

It is well known to a person skilled in the art that the upper and lower eyelids of en eye can have a different shaped arc, depending upon the fully or partially opening or fully closing position of the eye. When an eye is fully closed, both the arcs representing the edge of the upper eyelid and the edge of the lower eyelid are close to a straight line. When an eye is fully opened, both the arcs representing the edge of the upper eyelid and the edge of the lower eyelid have steep curvatures. Such relationship between the curvature of both the arcs representing the edge of the upper eyelid and the edge of the lower eyelid is preferably incorporated in the design of a contact lens of the invention as shown in FIG. 1, namely, closer to the horizontal meridian an isoline, flatter the curvature of the isoline.

Figure 2:
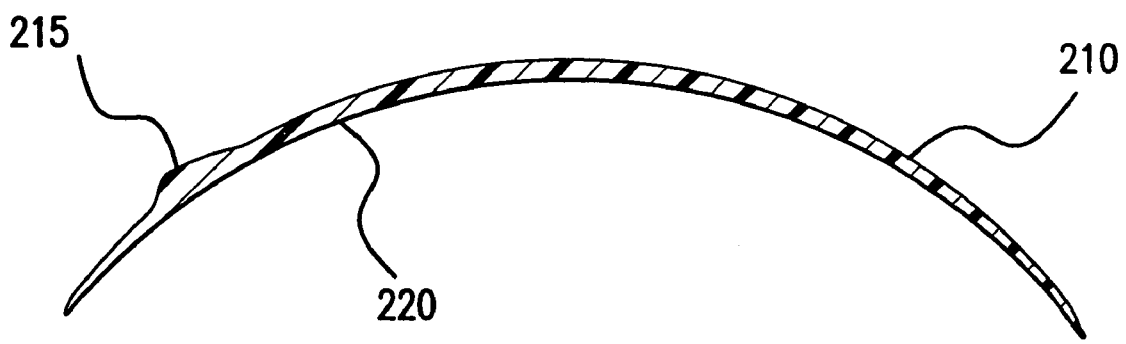
FIG. 2 is a sectional view of a contact lens having a ramped ridge zone on the anterior surface of the lens according to a preferred embodiment of the invention.

In a preferred embodiment, the peripheral zone of the anterior surface includes a ramped ridge zone, as shown in FIG. 2, the thickness will decrease progressively from the top of the anterior surface downwardly along the vertical meridian 105 and each of lines parallel to the vertical meridian 105 until reaching a maximum value at a position between the optical zone and the edge zone and then decreases to the edge of the edge zone. The thickness of the lens outside of the central optical zone 110 has a mirror symmetry with respect to a plane cutting through the vertical meridian 105.

In another preferred embodiment, the thickness across the central region around the horizontal meridian 103 will remain relatively constant and decrease progressively from the horizontal meridian 103 to the top or bottom of the anterior surface along the vertical meridian 105 and along each of lines parallel to the vertical meridian 105. More preferably, the thickness decreases sharply in a region near the top of the lens.

The circular edge zone 140 extends outwardly from the outer peripheral edge of the peripheral zone 130. The edge zone 140 is tangent to the peripheral zone and, in combination with the posterior surface, provides a substantially uniform thickness which may provide comfortable lens fit on an eye.

FIG. 2 is a sectional view of a contact lens having a ramped ridge zone according to a preferred embodiment of the invention. The contact lens has an anterior surface 210 and an opposite posterior surface 220. The peripheral zone of the anterior surface 210 includes a ramped ridge zone 215 which provides vertical translation support for the lens 100 and is stabilization means for maintaining lens orientation on an eye. The ramped ridge zone 215 is disposed below the optical zone. The ramped ridge zone 215 has an upper edge, a lower ramp edge, a first side edge, a second side edge, a latitudinal ridge extends outwardly from the anterior surface 210, and a ramp. When the eye moves in a downward direction, the user's lower eyelid can engage gradually first with the ramp, then the lower ramp edge and finally the latitudinal ridge, thereby allowing translation of the lens across the surface of the eye.

With advances in computer aided design (CAD) technologies, a person skilled in the art now can design a contact lens having complex surface designs including non-rotationally-symmetric surfaces. By using an optical computer aided design (CAD) system and a mechanical CAD system, one can design a toric multifocal contact lens of the invention, one of the surfaces which comprises a central optical zone having a toric optics feature and/or a multifocal optics feature so that the toric multifocal contact lens can have a cylindrical optical power to correct astigmatism and a multifocal power to compensate for presbyopia.

An optical CAD system is used to design an optical model lens. "An optical model lens" refers to an ophthalmic lens that is designed in a computer system and generally does not contain other non-optical systems which are parts of an ophthalmic lens.

Any known, suitable optical computer aided design (CAD) system may be used to design an optical model lens. Exemplary optical computer aided design systems includes, but are not limited to Advanced System Analysis program (ASAP) from Breault Research Organization and ZEMAX (Focus Software, Inc.). Preferably, the optical design will be performed using Advanced System Analysis program (ASAP) from Breault Research Organization with input from ZEMAX (Focus Software, Inc.).

The design of the optical model lens can be transformed by, for example, a mechanical CAD system, into a mechanical lens design that includes optical zones, peripheral zones and blending zones. Preferably, when transforming the design of an optimized optical model lens into a mechanical lens design, at least the peripheral zone of the anterior surface has a common design for a family of contact lenses and the optical zone and the peripheral zone are patched together by a blending zone which ensures a continuous transition between the two zones.

Any know, suitable mechanical CAD system can be used in the invention. Preferably, a mechanical CAD system capable of representing precisely and mathematically high order surfaces is used to design a contact lens. An example of such mechanical CAD system is Pro/Engineer.

Preferably, the design of a contact lens may be translated back and forth between the optical CAD and mechanical CAD systems using a translation format which allows a receiving system, either optical CAD or mechanical CAD, to construct NURBs or Beizier surfaces of an intended design. Exemplary translation formats include, but are not limited to, VDA (verband der automobilindustrie) and IGES (Initial Graphics Exchange Specification). By using such translation formats, overall surface of lenses can be in a continuous form that facilitates the production of lenses having radially asymmetrical shapes. Beizier and NURBs surface are particular advantageous for presbyopic design because multiple zones can be blended, analyzed and optimized.

Any mathematical function can be used to describe the anterior surface, posterior surface, peripheral edge of an ophthalmic lens, as long as they have sufficient dynamic range which allow the design of that lens to be optimized. Exemplary mathematical functions include conic and quadric functions, polynomials of any degree, Zernike polynomials, exponential functions, trigonometric functions, hyperbolic functions, rational functions, Fourier series, and wavelets. Preferably, a combination of two or more mathematical functions are used to describe the front (anterior) surface and base (posterior) surface of an ophthalmic lens. More preferably, Zernike polynomials are used to describe the front (anterior) surface and base (posterior) surface of an ophthalmic lens. Even more preferably, Zernike polynomials and spline-based mathematical functions are used together to describe the front (anterior) surface and base (posterior) surface of an ophthalmic lens.

In another embodiment, the present invention provides a family of contact lenses having a series of different cylindrical power corrections and/or different multifocal powers, wherein each contact lens in the series comprises: an anterior surface having a vertical meridian, a horizontal meridian, a central optical zone, a blending zone extending outwardly from the central optical zone, a peripheral zone surrounding the blending zone, and an edge zone circumscribing and tangent to the peripheral zone; and an opposite posterior surface, wherein the peripheral zone, the blending zone and the central optical zone are tangent to each other, and wherein the peripheral zone has a surface that, in combination with the posterior surface, provides in the peripheral zone of the lens a thickness profile which is characterized (1) by having a lens thickness which increases progressively from the top of the lens downwardly along each of the vertical meridian and lines parallel to the vertical meridian until reaching a maximum value at a position between the optical zone and the edge zone and then decreases to the edge of the edge zone; or (2) by by having a mirror symmetry with respect to a plane cutting through the vertical meridian, by having a substantially constant thickness in a region around the horizonal meridian and by having a thickness which decreases progressively from the horizontal meridian to the top or bottom of the contact lens along each of the vertical meridian and lines parallel to the vertical meridian.

Contact lenses of the invention can be either hard or soft lenses. Soft contact lenses of the invention is preferably made from a soft contact lens material, such as a silicon hydro-gel or HEMA. It will be understood that any lens described above comprising any soft contact lens material would fall within the scope of the invention.

After completing a desired design, a contact lens of the invention can be produced in a computer-controlled manufacturing system. The lens design can be converted into a data file containing control signals that is interpreted by a computer-controlled manufacturing device. A computer-controlled manufacturing device is a device that can be controlled by a computer system and that is capable of producing directly an ophthalmic lens or an optical tools for producing an ophthalmic lens. Any known, suitable computer controllable manufacturing device can be used in the invention. Preferably, a computer controllable manufacturing device is a numerically controlled lathe, preferably a two-axis lathe with a 45° piezo cutter or a lathe apparatus disclosed by Durazo and Morgan in U.S. Pat. No. 6,122,999, herein incorporated by reference in its entirety, more preferably a numerically controlled lathe from Precitech, Inc., for example, such as Optoform ultra-precision lathes (models 30, 40, 50 and 80) having Variform piezo-ceramic fast tool servo attachment.

Preferably, contact lenses are molded from contact lens molds including molding surfaces that replicate the contact lens surfaces when a lens is cast in the molds. For example, an optical cutting tool with a numerically controlled lathe may be used to form metallic optical tools. The tools are then used to make convex and concave surface molds that are then used, in conjunction with each other, to form the lens of the invention using a suitable liquid lens-forming material placed between the molds followed by compression and curing of the lens-forming material.

Accordingly, contact lenses according to the invention can be manufactured by imparting contact lens molds two molding surfaces, a first molding surface and a second molding surface. The molds having the first molding surface or the second molding surface, in conjunction with each other, form a contact lens of the invention comprising an anterior surface having a vertical meridian, a horizontal meridian, a central optical zone, a blending zone extending outwardly from the central optical zone, a peripheral zone surrounding the blending zone, and an edge zone circumscribing and tangent to the peripheral zone; and an opposite posterior surface, wherein the peripheral zone, the blending zone and the central optical zone are tangent to each other, and wherein the peripheral zone has a surface that, in combination with the posterior surface, provides in the peripheral zone of the lens a thickness profile which is characterized (1) by having a lens thickness which increases progressively from the top of the lens downwardly along each of the vertical meridian and lines parallel to the vertical meridian until reaching a maximum value at a position between the optical zone and the edge zone and then decreases to the edge of the edge zone; or (2) by having a mirror symmetry with respect to a plane cutting through the vertical meridian, by having a substantially constant thickness in a region around the horizonal meridian and by having a thickness which decreases progressively from the horizontal meridian to the top or bottom of the contact lens along each of the vertical meridian and lines parallel to the vertical meridian.

In a further embodiment, the present invention provides a method for producing a contact lens of the invention. The method comprises the steps of shaping a contact lens by a manufacturing means to have an anterior surface having a vertical meridian, a horizontal meridian, a central optical zone, a blending zone extending outwardly from the central optical zone, a peripheral zone surrounding the blending zone, and an edge zone circumscribing and tangent to the peripheral zone; and an opposite posterior surface, wherein the blending zone has a surface which ensures that the peripheral zone, the blending zone and the central optical zone are tangent to each other, and wherein the peripheral zone has a surface that, in combination with the posterior surface, provides in the peripheral zone of the lens a thickness profile which is characterized (1) by having a lens thickness which increases progressively from the top of the lens downwardly along each of the vertical meridian and lines parallel to the vertical meridian until reaching a maximum value at a position between the optical zone and the edge zone and then decreases to the edge of the edge zone; or (2) by having a mirror symmetry with respect to a plane cutting through the vertical meridian, by having a substantially constant thickness in a region around the horizonal meridian and by having a thickness which decreases progressively from the horizontal meridian to the top or bottom of the contact lens along each of the vertical meridian and lines parallel to the vertical meridian.

Preferably, a contact lens having complicated surface feature or the optical tool to be used for making the same is fabricated by using a numerically controlled lathe, for example, such as Optoform ultra-precision lathes (models 30, 40, 50 and 80) having Variform piezo-ceramic fast tool servo attachment from Sterling International Technologies, Inc, according to a method described in co-pending U.S. patent application Ser. No., entitled Method for Manufacturing a contact lens, herein incorporated by reference in its entirety.

As an illustrative example, production of a translating contact lens having a ramped ridge zone having a latitudinal ridge that is composed of two bumps is described as follows.

First, an user defines a set of parameters, such as a surface tolerance, a concentricity tolerance, orientation of the lens design, the number of spokes to be generated for each of the anterior and posterior surfaces, creating zero point at 0,0, orientation of Z-axis, and type of lens surface (concave or convex surface) to be converted into a geometry.

A "surface tolerance" refers to the allowed position-deviation of a projected point from an ideal position on a surface of a lens design. The deviation can be in the direction either parallel or perpendicular to the central axis of a lens design.

A "concentricity tolerance" refers to the allowed deviation of a point from a given arc.

A "spoke" refers to a ray radiating outwardly from the central axis and is perpendicular to the central axis.

A "semi-diameter spoke" refers to a line segment from the central axis to the edge of a lens design.

"Evenly-spaced semi-diameter spokes" means that all semi-diameter spokes radiate outwardly from the central axis and separate from each other by one equal angle.

A "point spacing" refers to a distance between two points along the semi-diameter spoke.

Second, an user determines the number of points to be projected onto the a surface of the lens design (for example, the anterior surface) along each of the number of evenly-spaced semi-diameter spokes in a direction parallel to the central axis. A semi-diameter spoke at an azimuthal angle, at which one of the two bumps of the anterior surface is located, is selected as the semi-diameter probing spoke. Evenly-spaced points are projected along the semi-diameter probing spoke, in which each pairs of points are separating by a point spacing of 10 microns. Then, all of the projected points are divided into a series of groups, each group composed of three consecutive points, a first point, a middle point and a third point. Each of the points can belong to either one group or two groups. One group at a time from the central axis to the edge or from the edge to the central axis, the curvature of the surface at the middle point of the group is analyzed by comparing a distance between the middle point and a line linking the first point and the third point of the corresponding group with the predetermined surface tolerance. If the distance between the middle point and the line linking the first and third points of the group is larger than the predetermined surface tolerance, the curvature of the surface at that point is sharp and an additional point is projected between the first and the middle points in that group. The point spacing between the first and additional points is equal to point spacing between the additional and middle points. After adding an additional point, all of the points included the newly added point is regrouped again and the curvature of the surface at the middle point of each of the series of groups is analyzed. Such iterative procedure is repeated until the distance between the middle point of each of the series of groups and the line linking the first and the third points of corresponding group along the probing spoke is equal to or less than the predetermined surface tolerance. In this way, the number of the points to be projected onto the surface of the lens design along each of the desired number of evenly-spaced semi-diameter spokes and point spacings for a series of pairs of neighboring points are determined.

The above-determined number of points are projected onto the anterior surface of the lens design along each of 96 semi-diameter spokes. For each of the semi-diameter spokes, a semi-meridian which is continuous in first derivative is generated. The semi-meridian includes a series of arcs and optionally straight lines, wherein each arc is defined by fitting at least three consecutive points into a spherical mathematical function within a desired concentricity tolerance. Each of the straight lines is obtained by connecting at least three consecutive points. Preferably, arc fitting routine is started from the central axis to the edge.

Similarly, conversion of the posterior surface of the lens design into a geometry can be carried out according to the above described procedure.

After converting the lens design to a geometry of a contact lens to be produced in a manufacturing system, a mini-file containing both the information for the header and the information about the geometry of the lens is generated. This mini-file also contains a zero semi-meridian that is based on the average height of each of the other meridians at each of radial locations and that gives the Variform a zero position on which it can base its oscillation calculations. In this mini-file, all semi-meridians have the same number of zones. This is accomplished by copying the last zone of a semi-meridian for a number of time to equalize the numbers of zones for all meridians. After the mini-file is complete, it is loaded into an Optoform ultra-precision lathe (models 30, 40, 50 or 80) having Variform piezo-ceramic fast tool servo attachment and run to produce a translating contact lens.

The invention has been described in detail, with particular reference to certain preferred embodiments, in order to enable the reader to practice the invention without undue experimentation. A person having ordinary skill in the art will readily recognize that many of the previous components, compositions, and/or parameters may be varied or modified to a reasonable extent without departing from the scope and spirit of the invention. Furthermore, titles, headings, example materials or the like are provided to enhance the reader's comprehension of this document, and should not be read as limiting the scope of the present invention. Accordingly, the invention is defined by the following claims, and reasonable extensions and equivalents thereof.

What is claimed is:

1. A contact lens, comprising:
a posterior surface; and
an opposite anterior surface including a vertical meridian, a horizontal meridian, a central optical zone, a transitional non-optical zone extending outwardly from the central optical zone and surrounding the central optical zone, a peripheral zone surrounding the transitional non-optical zone, and an edge zone circumscribing and tangent to the peripheral zone,
wherein the central optical zone and the peripheral zone are designed separately and independently from each other and then blended together by the transitional non-optical zone to eliminate flexion points or sharp edges or both at junction between the central and peripheral zones,
wherein the transitional non-optical zone has a surface which provides a continuous transition from the central optical zone to the peripheral zone and ensures that the peripheral zone, the transitional non-optical zone and the central optical zone are tangent to each other, and wherein the peripheral zone has a surface that, in combination with the posterior surface, provides in the peripheral zone of the lens a thickness profile which is characterized (1) by having a lens thickness which increases progressively from the top of the peripheral zone downwardly along each of the vertical meridian and lines parallel to the vertical meridian until reaching a maximum value within the peripheral zone at a position between the central optical zone and the edge zone and then decreases to the upper edge of the edge zone, or (2) by having a mirror symmetry with respect to a plane cutting through the vertical meridian, by having a substantially constant thickness in the peripheral zone along the horizontal meridian and by having a thickness which decreases progressively from the horizontal meridian upward to the bottom edge of the edge zone or downward to the top of edge of the edge zone along each of the vertical meridian and lines parallel to the vertical meridian.

2. A contact lens of claim 1, wherein the area of the peripheral zone is equal to or larger than the area of the central optical zone.

3. A contact lens of claim 1, wherein the thickness profile is characterized by having a lens thickness which increases progressively from the top of the peripheral zone downwardly along each of the vertical meridian and lines parallel to the vertical meridian until reaching a maximum value at a position between the central optical zone and the edge zone and then decreases to the upper edge of the edge zone.

4. A contact lens of claim 3, wherein the lens thickness profile has a mirror symmetry with respect to a plane cutting through the vertical meridian.

5. A contact lens of claim 3, wherein the anterior surface has a series of isolines running from one side to the other side of the lens, wherein the lens thickness in the peripheral zone remains substantially constant along each of the series of isolines.

6. A contact lens of claim 5, wherein one of the isolines is a straight line coincidental with the horizontal meridian and the rest of the isolines are arcs, wherein each of arcs above the horizontal meridian is different from each other and mimics one arc of the edge of the upper eyelid of an eye at an eye-opening position, whereas each of arcs below the horizontal meridian is different from each other and mimics one arc of the edge of the lower eyelid of the eye at an eye-opening position.

7. A contact lens of claim 3, wherein the peripheral zone comprises a ridge feature disposed below the central optical zone, wherein the ridge feature extends outwardly from the the anterior surface to enable engagement with a lower eyelid of a user and thereby provide vertical translation support for the contact lens when being worn by the user.

8. A contact lens of claim 3, wherein the peripheral zone comprises a ramped ridge zone disposed below the optical zone, wherein the ramped ridge zone includes an upper edge, a lower ramped edge, a latitudinal ridge that extends outwardly from the anterior surface, and a ramp that is a blending zone ensuring a smooth transition between the lower ramped edge and surrounding surface of the peripheral zone.

9. A contact lens of claim 8, wherein the lower ramped edge and the latitudinal ridge are flattened in shape.

10. A contact lens of claim 3, wherein the entire peripheral zone has a continuity in first derivative and/or in second derivative.

11. A contact lens of claim 10, wherein peripheral zone is defined by a spline-based mathematical function, or is made of several different surface patches.

12. A contact lens of claim 3, wherein the contact lens is a toric, multifocal, or a toric multifocal contact lens.

13. A contact lens of claim 1, wherein the thickness profile is characterized by having a mirror symmetry with respect to a plane cutting through the vertical meridian, by having a substantially constant thickness in a region around the horizonal meridian and by having a thickness which decreases progressively from the horizontal meridian upward to the bottom edge of the edge zone or downward to the top of edge of the edge zone along each of the vertical meridian and lines parallel to the vertical meridian.

14. A contact lens of claim 13, wherein the anterior surface has a series of isolines running from one side to the other side of the lens, wherein the lens thickness in the peripheral zone remains substantially constant along each of the series of isolines.

15. A contact lens of claim 14, wherein one of the isolines is a straight line coincidental with the horizontal meridian and the rest of the isolines are arcs, wherein each of arcs above the horizontal meridian is different from each other and mimics one arc of the edge of the upper eyelid of an eye at an eye-opening position, whereas each of arcs below the horizontal meridian is different from each other and mimics one arc of the edge of the lower eyelid of the eye at an eye-opening position.

16. A contact lens of claim 13, wherein the thickness of the lens in the peripheral zone decreases significantly when approaching the top or bottom of the lens.

17. A contact lens of claim 1, wherein the edge zone is circular and, in combination with the posterior surface, provides a substantially uniform thickness around the edge of the contact lens.

18. A contact lens of claim 1, wherein the anterior surface is continuous in first derivative and/or in second derivative from center to edge.

19. A method of producing a contact lens, comprising the steps of shaping the contact lens by a manufacturing means to have an anterior surface having a vertical meridian, a horizontal meridian, a central optical zone, a transitional non-optical zone extending outwardly from the central optical zone and surrounding the central optical zone, a peripheral zone surrounding the transitional non-optical zone, and an edge zone circumscribing and tangent to the peripheral zone; and an opposite posterior surface, wherein the central optical zone and the peripheral zone are designed separately and independently from each other and blended together by the transitional non-optical zone to eliminate flexion points or sharp edges or both at junction between the central and peripheral zones, wherein the transitional non-optical zone has a surface which provides a continuous transition from the central optical zone to the peripheral zone and ensures that the peripheral zone, the transitional non-optical zone and the central optical zone are tangent to each other, and wherein the peripheral zone has a surface that, in combination with the posterior surface, provides in the peripheral zone of the lens a thickness profile which is characterized (1) by having a lens thickness which increases progressively from the top of the peripheral zone downwardly along each of the vertical meridian and lines parallel to the vertical meridian until reaching a maximum value within the peripheral zone at a position between the central optical zone and the edge zone and then decreases to the upper edge of the edge zone; or (2) by having a mirror symmetry with respect to a plane cutting through the vertical meridian, by having a substantially constant thickness in the peripheral zone along the horizonal meridian and by having a thickness which decreases progressively from the horizontal meridian upward to the bottom edge of the edge zone or downward to the top of edge of the edge zone along each of the vertical meridian and lines parallel to the vertical meridian.

20. A method of claim 19, wherein said manufacturing means is a numerically controlled lathe or molds.

21. A method of claim 19, wherein the thickness profile is characterized by having a lens thickness which increases progressively from the top of the peripheral zone downwardly along each of the vertical meridian and lines parallel to the vertical meridian until reaching a maximum value at a position between the central optical zone and the edge zone and then decreases to the upper edge of the edge zone.

22. A method of claim 21, wherein the lens thickness profile has a mirror symmetry with respect to a plane cutting through the vertical meridian.

23. A method of claim 21, wherein the anterior surface has a series of isolines running from one side to the other side of the lens, wherein the lens thickness in the peripheral zone remains substantially constant along each of the series of isolines.

24. A method of claim 23, wherein one of the isolines is a straight line coincidental with the horizontal meridian and the rest of the isolines are arcs, wherein each of arcs above the horizontal meridian is different from each other and mimics one arc of the edge of the upper eyelid of an eye at an eye-opening position, whereas each of arcs below the horizontal meridian is different from each other and mimics one arc of the edge of the lower eyelid of the eye at an eye-opening position.

25. A method of claim 21, wherein the peripheral zone comprises: (i) a ridge feature disposed below the central optical zone, wherein the ridge feature extends outwardly from the anterior surface to enable engagement with a lower eyelid of a user and thereby provide vertical translation support for the contact lens when being worn by the user; or (ii) a ramped ridge zone disposed below the central optical zone, wherein the ramped ridge zone includes an upper edge, a lower ramped edge, a latitudinal ridge that extends outwardly from the anterior surface, and a ramp that ensures a smooth transition between the lower ramped edge and surrounding surface of the peripheral zone.

26. A method of claim 19, wherein the thickness profile is characterized by having a mirror symmetry with respect to a plane cutting through the vertical meridian, by having a substantially constant thickness in a region around the horizonal meridian and by having a thickness which decreases progressively from the horizontal meridian upward to the bottom edge of the edge zone or downward to the top of edge of the edge zone along each of the vertical meridian and lines parallel to the vertical meridian.

27. A method of claim 26, wherein the anterior surface has a series of isolines running from one side to the other side of the lens, wherein the lens thickness in the peripheral zone remains substantially constant along each of the series of isolines.

28. A method of claim 27, wherein one of the isolines is a straight line coincidental with the horizontal meridian and the rest of the isolines are arcs, wherein each of arcs above the horizontal meridian is different from each other and mimics one arc of the edge of the upper eyelid of an eye at an eye-opening position, whereas each of arcs below the horizontal meridian is different from each other and mimics one arc of the edge of the lower eyelid of the eye at an eye-opening position.

29. A method of claim 26, wherein the thickness of the lens in the peripheral zone decreases significantly when approaching the top or bottom of the lens.

30. A method of claim 19, wherein the entire peripheral zone has a continuity in first derivative and/or in second derivative and is defined by a spline-based mathematical function or made of several different surface patches.

31. A method of claim 19, wherein the transitional non-optical zone is defined by a spline-based mathematical function or is made of several different surface patches.

32. A method of claim 19, wherein the contact lens is a bifocal contact lens, a multifocal contact lens, a toric contact lens, a toric bifocal contact lens, or a toric multifocal contact lens.

33. A method of claim 19, wherein the edge zone is circular and, in combination with the posterior surface, provides a substantially uniform thickness around the edge of the contact lens.

34. A method of claim 33, wherein the anterior surface is continuous in first derivative and/or in second derivative from center to edge.

35. A series of contact lenses having a series of different cylindrical power corrections, or different multifocal powers, or both, wherein each contact lens in the series comprises: an anterior surface having a vertical meridian, a horizontal meridian, a central optical zone, a transitional non-optical zone extending outwardly from the central optical zone and surrounding the central optical zone, a peripheral zone surrounding the transitional non-optical zone, and an edge zone circumscribing and tangent to the peripheral zone; and an opposite posterior surface, wherein the central optical zone and the peripheral zone are designed separately and independently from each other and then blended together by the transitional non-optical zone to eliminate flexion points or sharp edges or both at junction between the central and peripheral zones, wherein the transitional non-optical zone has a surface which provides a continuous transition from the central optical zone to the peripheral zone and ensures that the peripheral zone, the transitional non-optical zone and the central optical zone are tangent to each other, and wherein the peripheral zone has a surface that, in combination with the posterior surface, provides in the peripheral zone of the lens a thickness profile which is characterized (1) by having a lens thickness which increases progressively from the top of the peripheral zone downwardly along each of the vertical meridian and lines parallel to the vertical meridian until reaching a maximum value within the peripheral zone at a position between the central optical zone and the edge zone and then decreases to the upper edge of the edge zone; or (2) by having a mirror symmetry with respect to a plane cutting through the vertical meridian, by having a substantially constant thickness in the peripheral zone along the horizonal meridian and by having a thickness which decreases progressively from the horizontal meridian upward to the bottom edge of the edge zone or downward to the top of edge of the edge zone along each of the vertical meridian and lines parallel to the vertical meridian.

36. A series of contact lenses of claim 35, wherein the thickness profile is characterized by having a lens thickness which increases progressively from the top of the peripheral zone downwardly along each of the vertical meridian and lines parallel to the vertical meridian until reaching a maximum value at a position between the central optical zone and the edge zone and then decreases to the upper edge of the edge zone.

37. A series of contact lenses of claim 36, wherein the lens thickness profile has a mirror symmetry with respect to a plane cutting through the vertical meridian.

38. A series of contact lenses of claim 36, wherein the anterior surface has a series of isolines running from one side to the other side of the lens, wherein the lens thickness in the peripheral zone remains substantially constant along each of the series of isolines.

39. A series of contact lenses of claim 38, wherein one of the isolines is a straight line coincidental with the horizontal meridian and the rest of the isolines are arcs, wherein each of arcs above the horizontal meridian is different from each other and mimics one arc of the edge of the upper eyelid of an eye at an eye-opening position, whereas each of arcs below the horizontal meridian is different from each other and mimics one arc of the edge of the lower eyelid of the eye at an eye-opening position.

40. A series of contact lenses of claim 36, wherein the peripheral zone comprises: (i) a ridge feature disposed below the central optical zone, wherein the ridge feature extends outwardly from the anterior surface to enable engagement with a lower eyelid of a user and thereby provide vertical translation support for the contact lens when being worn by the user; or (ii) a ramped ridge zone disposed below the central optical zone, wherein the ramped ridge zone includes an upper edge, a lower ramped edge, a latitudinal ridge that extends outwardly from the anterior surface, and a ramp that ensures a smooth transition between the lower ramped edge and surrounding surface of the peripheral zone.

41. A series of contact lenses of claim 35, wherein the thickness profile is characterized by having a mirror symmetry with respect to a plane cutting through the vertical meridian, by having a substantially constant thickness in a region around the horizonal meridian and by having a thickness which decreases progressively from the horizontal meridian upward to the bottom edge of the edge zone or downward to the top of edge of the edge zone along each of the vertical meridian and lines parallel to the vertical meridian.

42. A series of contact lenses of claim 41, wherein the anterior surface has a series of isolines running from one side to the other side of the lens, wherein the lens thickness in the peripheral zone remains substantially constant along each of the series of isolines.

43. A series of contact lenses of claim 42, wherein one of the isolines is a straight line coincidental with the horizontal meridian and the rest of the isolines are arcs, wherein each of arcs above the horizontal meridian is different from each other and mimics one arc of the edge of the upper eyelid of an eye at an eye-opening position, whereas each of arcs below the horizontal meridian is different from each other and mimics one arc of the edge of the lower eyelid of the eye at an eye-opening position.

44. A series of contact lenses of claim 41, wherein the thickness of the lens in the peripheral zone decreases significantly when approaching the top or bottom of the lens.

45. A series of contact lenses of claim 35, wherein the entire peripheral zone has a continuity in first derivative and/or in second derivative and is defined by a spline-based mathematical function or made of several different surface patches.

46. A series of contact lenses of claim 35, wherein the transitional non-optical zone is defined by a spline-based mathematical function or is made of several different surface patches.

47. A series of contact lenses of claim 35, wherein the edge zone is circular and, in combination with the posterior surface, provides a substantially uniform thickness around the edge of the contact lens.

48. A series of contact lenses of claim 29, wherein the anterior surface is continuous in first derivative and/or in second derivative from center to edge.

* * * * *